United States Patent
Ito et al.

(10) Patent No.: US 7,546,030 B2
(45) Date of Patent: Jun. 9, 2009

(54) AUTOFOCUS DEVICE AND METHOD

(75) Inventors: Yujiro Ito, Kanagawa (JP); Hidekazu Suto, Tokyo (JP); Shinji Takemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 497 days.

(21) Appl. No.: 11/403,013

(22) Filed: Apr. 12, 2006

(65) Prior Publication Data

US 2006/0232698 A1      Oct. 19, 2006

(30) Foreign Application Priority Data

Apr. 15, 2005   (JP)   ............................ P2005-119034

(51) Int. Cl.
G03B 17/00 (2006.01)
G03B 3/00 (2006.01)
G03B 3/10 (2006.01)
G03B 13/34 (2006.01)

(52) U.S. Cl. ............................ 396/79; 396/90; 396/135; 348/345

(58) Field of Classification Search ............. 396/89–91, 396/135, 301, 302, 529, 531, 532, 79; 250/201.2; 348/345, 347

See application file for complete search history.

(56) References Cited

U.S. PATENT DOCUMENTS

| 6,029,017 | A  | * | 2/2000 | Miyazawa et al. | ........... 396/532 |
| 6,624,402 | B2 | * | 9/2003 | Kaneko et al. | ............ 250/201.2 |
| 7,098,954 | B2 | * | 8/2006 | Suda et al. | ................... 348/347 |

FOREIGN PATENT DOCUMENTS

JP           10-213736           8/1998

* cited by examiner

*Primary Examiner*—Melissa J Koval
(74) *Attorney, Agent, or Firm*—Frommer Lawrence & Haug LLP; William S. Frommer; Ellen Marcie Emas

(57) ABSTRACT

Autofocus device has a lens-driving unit that drives a lens and a focal-point-position-detecting unit that detects a position of a focal point of the lens. The device also has a distance-measuring sensor that measures a distance to a subject and a control unit that performs a focusing operation to control the lens-driving unit to drive the lens, thereby meeting the position of the focal point of the lens detected by the focal-point-position-detecting unit to an in-focus position thereof. The control unit allows to be set a driving direction of the lens and a driving speed of the lens based on the position of the focal point of the lens detected by the focal-point-position-detecting unit and a distance measurement result measured by the distance-measuring sensor. The focusing operation then starts.

9 Claims, 8 Drawing Sheets

AUTOFOCUS DEVICE AND METHOD

CROSS REFERENCE TO RELATED APPLICATION

The present invention contains subject matter related to Japanese Patent Application No. JP2005-119034 filed in the Japanese Patent Office on Apr. 15, 2005, the entire contents of which being incorporated herein by reference.

BACKGROUND OF THE INVENTION

1. Field of the Invention

This invention relates to autofocus device and method and a program product therefor, which are used in an imaging apparatus such as a video camera and a digital still camera.

2. Description of Related Art

The imaging apparatus such as a video camera and a digital still camera has been equipped with any autofocus mechanism that automatically focuses on a subject. The autofocus mechanism adds frequency components of an image signal in a particular region that is provided in an imaging frame (finder's view) to calculate a focus evaluation value thereof and drives a focus lens so that the maximum focus evaluation value can be given (see Japanese Patent Application Publication No. H10-213736). Thus, if imaging after such the particular region is set on a center of the imaging frame and a composition of the imaging frame is fixed to put the subject on the center of the imaging frame, the subject can be automatically focused when a position of a focal point of the focus lens meets an in-focus position. When starting a focusing operation such that the focus lens is driven to meet the position of the focal point of the focus lens to the in-focus position, a wobbling lens wobbles in order to prevent the focus lens from being driven in a reverse direction against a direction in which an in-focus position stays, thereby determining a driving direction of the focus lens based on any alteration in the focus evaluation value at this wobbling.

SUMMARY OF THE INVENTION

A video camera used for broadcasting or professional use has lens with a large aperture to fail to wobble briefly and speedy, thereby resulting in spending much time for determining the driving direction of the focus lens.

Alternatively, as shown in FIG. 1, if a position of a focal point FPs of the focus lens when starting such a focusing operation stays away from an in-focus position FPj, namely, if any seriously blurred image occurs, a very small focus evaluation value is given. If wobbling in this condition, an alteration in the focus evaluation values is small and an incline showing such the alteration in the focus evaluation values nearly flats. As a result thereof, it may be difficult to determine a direction in which the in-focus position FPj stays. Particularly, the video camera used for broadcasting or professional use has a mechanism to extremely shallow the depth-of-field thereof, so that the incline showing the alteration in the focus evaluation values further flats on a position where a position of a focal point FPs of the focus lens stays away from an in-focus position FPj. In this condition, even if the wobbling lens wobbles, it may be further difficult to determine a driving direction of the focus lens.

Further, if the focus lens may be once driven on the reverse direction against a direction in which the in-focus position stays because a determination of the driving direction of the focus lens can be filed, the focus lens is not driven toward a direction in which the in-focus position FPj stays until the focus lens is driven up to Near end or Far end or until it has been determined that the focus lens is driven in the reverse direction. This elongates a period of focusing time for the focus lens to reach the in-focus position FPj, thereby failing to rapidly get an image without any blurs relative to the subject.

It is desirable to present autofocus device and method and a program product therefor that can rapidly drive the focus lens to meet the position of the focal point thereof to the in-focus position FPj and get an image without any blurs relative to the subject.

According to an embodiment of the present invention, there is provided an autofocus device having a lens-driving unit that drives a lens, and a focal-point-position-detecting unit that detects a position of a focal point of the lens. The autofocus device also has a distance-measuring sensor that measures a distance to a subject, and a control unit that performs a focusing operation to control the lens-driving unit to drive the lens, thereby meeting the position of the focal point of the lens detected by the focal-point-position-detecting unit to an in-focus position thereof.

The control unit allows to be set a driving direction of the lens and a driving speed of the lens based on the position of the focal point of the lens detected by the focal-point-position-detecting unit and a distance measurement result measured by the distance-measuring sensor. The focusing operation then starts.

According to another embodiment of the present invention, there is provided an autofocus method. The autofocus method contains a focal-point-position-detecting step of detecting a position of a focal point of the lens and a distance-measuring step of measuring a distance to a subject. The method also contains a lens-drive-setting step of setting a driving direction of the lens and a driving speed of the lens based on the position of the focal point of the lens detected at the focal-point-position-detecting step and a distance measurement result measured at the distance-measuring step, and a lens-driving step of performing a focusing operation to start driving the lens based on the driving direction of lens and the driving speed of the lens, which are set by the lens-drive-setting step, thereby meeting the position of the focal point of the lens to an in-focus position thereof.

According to further embodiment of the present invention, there is provided a computer program product that allows a computer to execute the above autofocus method.

According to any embodiments of the invention, the driving direction of the lens is set to a direction of in-focus region based on the measured distance result and the driving speed of the lens is set to a first driving speed that is, for example, a maximum speed of the lens driving speed when the detected position of the focal point stays away from the in-focus region based on the measured distance result with the detected position of the focal point further staying away from a first determined distance, and the focusing operation then starts.

Thereafter, the driving speed of the lens switches from the first driving speed thereof to a second driving speed that is slower than the first driving speed when the position of the focal point detected by the focal-point-position-detecting unit stays away from the in-focus region based on the measured distance result with the position of the focal point staying nearer the in-focus region than a second determined distance.

Further, the driving direction of the lens and the driving speed of the lens are set to a direction of in-focus region based on the measured distance result and a second driving speed that is slower than the first driving speed, respectively, when the position of the focal point detected by the focal-point-position-detecting unit stays nearer the in-focus region based on the measured distance result than the first determined distance with the position of the focal point staying out of the in-focus region, and the focus operation further starts.

When the position of the focal point detected by the focal-point-position-detecting unit stays within the in-focus region based on the measured distance result, the lens-driving unit drives the lens to meet a position of its focal point to an in-focus position having a maximum one of focus evaluation values. The focus evaluation values are calculated using frequency component(s) of image signal in a particular region provided in an imaging frame.

When the position of the focal point detected by the focal-point-position-detecting unit stays within the in-focus region based on the measured distance result or when the measured distance result indicates a position of a focal point staying nearer than a predetermined distance, the lens-driving unit wobbles the lens (for example, a wobbling lens) and then, the driving direction of the lens is set based on an alteration in the focus evaluation values at the wobbling thereof, and the focusing operation further starts.

Thus, according to any embodiments of the invention, the driving direction of the lens and the driving speed of the lens are set on the basis of the detected position of a focal point and the detected distance result and then, the focusing operation to drive the lens to meet a position of its focal point to an in-focus position starts. This start of driving the lens (for example, a focus lens) without any wobbling allows to be shortened a period of time for such the focusing operation, thereby getting an image of subject having no blur rapidly.

The concluding portion of this specification particularly points out and directly claims the subject matter of the present invention. However those skills in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

Figure 1:
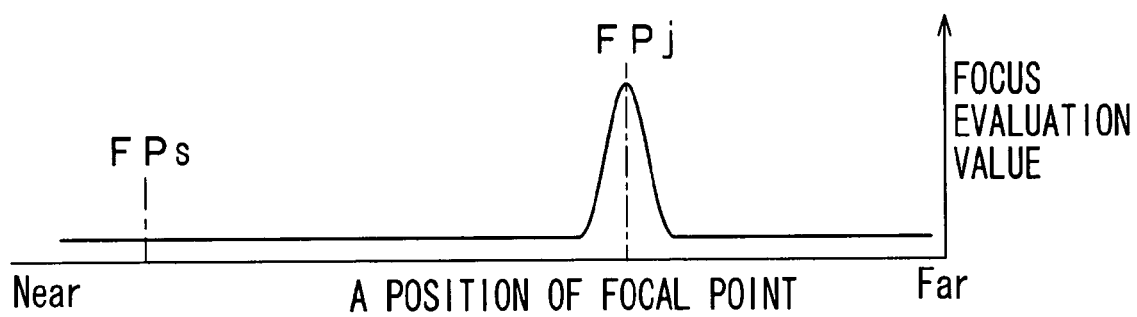
FIG. 1 is a graph illustrating a relationship between a position of focal point of focus lens and focus evaluation value.
Figure 2:
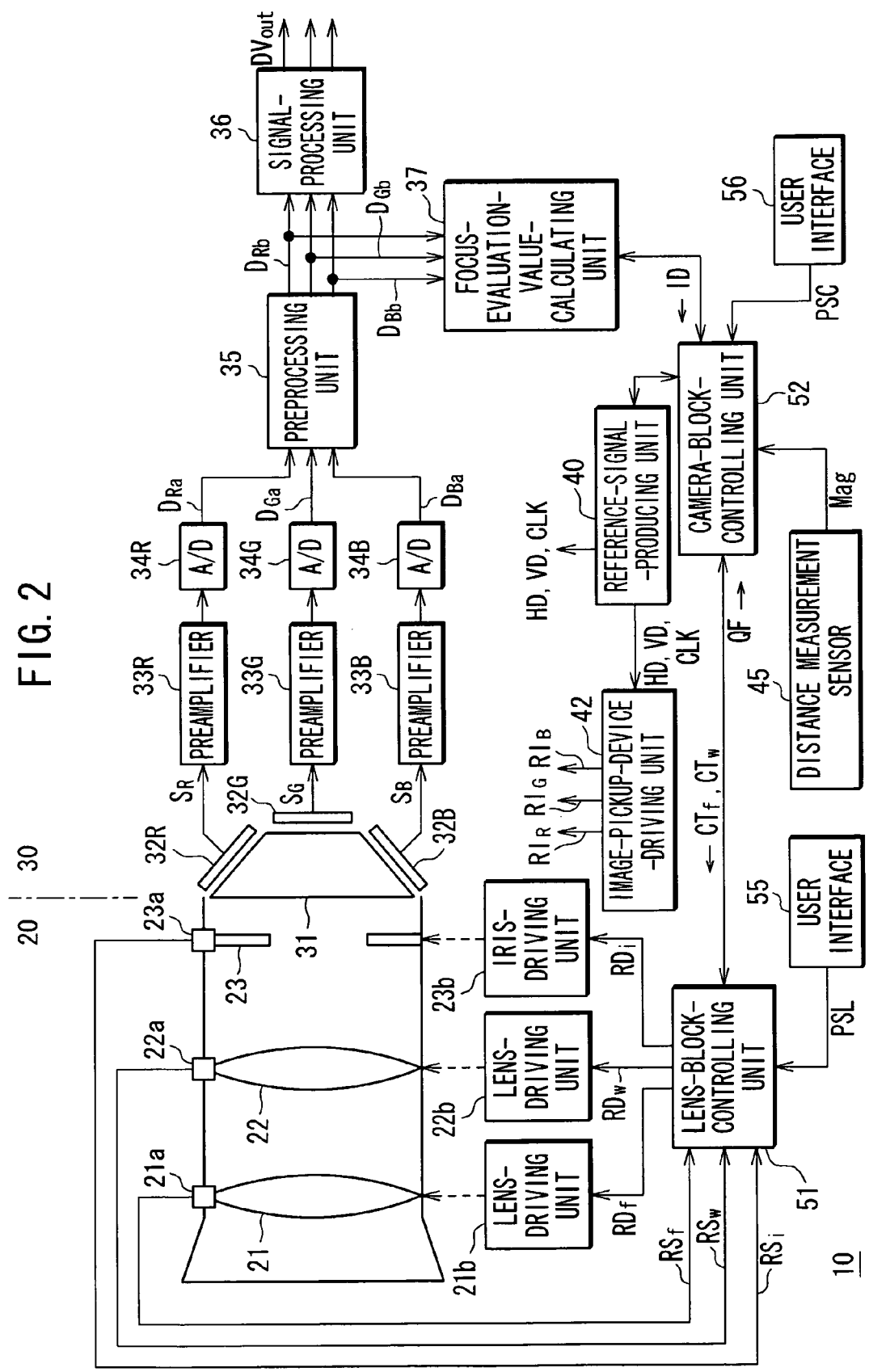
FIG. 2 is a block diagram for showing a configuration of a video camera.

The following will describe embodiments of the invention with reference to the accompanying drawings. FIG. 2 shows a whole configuration of an imaging apparatus such as a video camera 10 having an autofocus mechanism.

A lens block 20 of the video camera 10 is constituted of an imaging lens, a lens-position-detecting unit that detects a position of the imaging lens, lens-driving unit that drives the imaging lens and the like. It is to be noted that in the lens block 20 shown in FIG. 2, as the imaging lens, a focus lens 21 for focusing an image of subject on an imaging surface of an imaging element and a wobbling lens 22 for utilizing determination of a driving direction of the focus lens 21 to meet a position of its focal point to an in-focus position are illustrated.

For the focus lens 21, are provided a lens-position-detecting unit 21a that detects a position of the focus lens 21, i.e. a focal-point-position-detecting unit that detects a position of a focal point of the focus lens 21, and a lens-driving unit 21b that drives the focus lens 21 to move the lens position along its optical axis.

Similarly, for the wobbling lens 21, are provided a lens-position-detecting unit 22a that detects a position of the wobbling lens 22 and a lens-driving unit 22b that drives the wobbling lens 22 to move the lens position along its optical axis, in order to perform any suitable wobbling.

The lens block 20 has an iris 23 to control an amount of incident light. For the iris 23, also are provided an iris-position-detecting unit 23a that detects an opening level of an aperture of the iris 23 and an iris-driving unit 23b that drives the iris 23 so to be opened or shut.

A lens-block-controlling unit 51 receives a detection signal RSf indicating a position of a focal point of focus lens 21 from the lens-position-detecting unit 21a, a detection signal RSw indicating an amount of wobbling from the lens-position-detecting unit 22a, a detection signal RSi indicating an opening level of an aperture of the iris 23 from the iris-position-detecting unit 23a, respectively. The lens-block-controlling unit 51 is connected to a user interface 55 for setting an autofocus operation mode and starting an autofocus operation. According to user's manipulations of the user interface 55, the lens-block-controlling unit 51 can receive any manipulation signals PSL. The lens-block-controlling unit 51 can also have a storage unit, which is not shown, that is constituted of a read-only memory (ROM), an electrically erasable programmable read-only memory (EEPROM) or the like. The storage unit may store data on focal length of each of the focus lens 21 and the wobbling lens 22 and data on aperture ratio as well as any information on a manufacturer's name and serial number of the lens block, and the like.

The lens-block-controlling unit 51 generates lens-driving signals RDf, RDw based on the stored information, the detection signals RSf, RSw, and RSi, and the manipulation signals PSL as well as a focus-controlling signal CTf and a wobbling-controlling signal CTw that are received from a camera-block-controlling unit 52, which will be described later. The lens-block-controlling unit 51 further supplies the generated lens-diving signal RDf to the lens-driving unit 21b to drive the focus lens 21, thereby allowing a desired subject to be in focus. The lens-block-controlling unit 51 additionally supplies the generated lens-diving signal RDw to the lens-driving unit 22b to drive the wobbling lens 22, thereby allowing a direction of an in-focus position of the focus lens 21 to be detected. The lens-block-controlling unit 51 also generates an iris-controlling signal RDi and supplies it to the iris-driving unit 23b, thereby allowing the opening level of aperture of the iris 23 to be controlled.

A color separation prism 31 in a camera block 30 separates incident light from the lens block 20 into three primary colors of red (R), green (G), and blue (B) and supplies R component thereof to an image pickup device 32R, G component thereof to an image pickup device 32G, and B component thereof to an image pickup device 32B, respectively.

The image pickup device 32R generates an image signal SR corresponding to the R component by photoelectric conversion and supplies it to the preamplifier 33R. The image pickup device 32G generates an image signal SG corresponding to the G component by the photoelectric conversion and supplies it to the preamplifier 33G. The image pickup device 32B generates an image signal SB corresponding to the B component by the photoelectric conversion and supplies it to the preamplifier 33B.

The preamplifier 33R amplifies a level of the image signal SR, performs correlated dual sampling thereon to reduce any reset noise, and supplies the noise-reduced image signal SR to an A/D converter 34R. The A/D converter 34R receives the image signal SR, converts it into a digital image signal DRa, and supplies it to a preprocessing unit 35.

The preamplifier 33G amplifies a level of the image signal SG, performs correlated dual sampling thereon to reduce any reset noise, and supplies the noise-reduced image signal SG to an A/D converter 34G. The A/D converter 34G receives the image signal SG, converts it into a digital image signal DGa, and supplies it to the preprocessing unit 35.

The preamplifier 33B amplifies a level of the image signal SB, performs correlated dual sampling thereon to reduce any reset noise, and supplies the noise-reduced image signal SB to an A/D converter 34B. The A/D converter 34B receives the image signal SB, converts it into a digital image signal DBa, and supplies it to the preprocessing unit 35.

The preprocessing unit 35 receives the image signals DRa, DGa, and DBa to adjust their gains and to perform a stability of black level, an adjustment of dynamic range thereof and the like to generate image signals DRb, DGb, and DBb, and supplies the image signals DRb, DGb, and DBb thus generated to a signal-processing unit 36 and a focus-evaluation-value-calculating unit 37.

The signal-processing unit 36 receives the image signals DRb, DGb, and DBb to perform various kinds of signal processing on them, thereby generating image output signals DVout. For example, Knee compensation for compressing an image signal having a level over a set level, gamma correction for correcting a level of the image signal according to any various set gamma curves, and white and black clipping for limiting a level of the image signal to stay into a set region are performed. The signal-processing unit 36 also performs edge enhancement processing, linear matrix processing, encoding processing for generating the image output signal DVout having a desired format and the like.

The focus-evaluation-value-calculating unit 37 calculates any focus evaluation values ID from the image signals DRb, DGb, and DBb using frequency components of these image signals in a particular region that is provided in an imaging frame and supplies the focus evaluation values ID to the camera-block-controlling unit 52.

Figure 3:
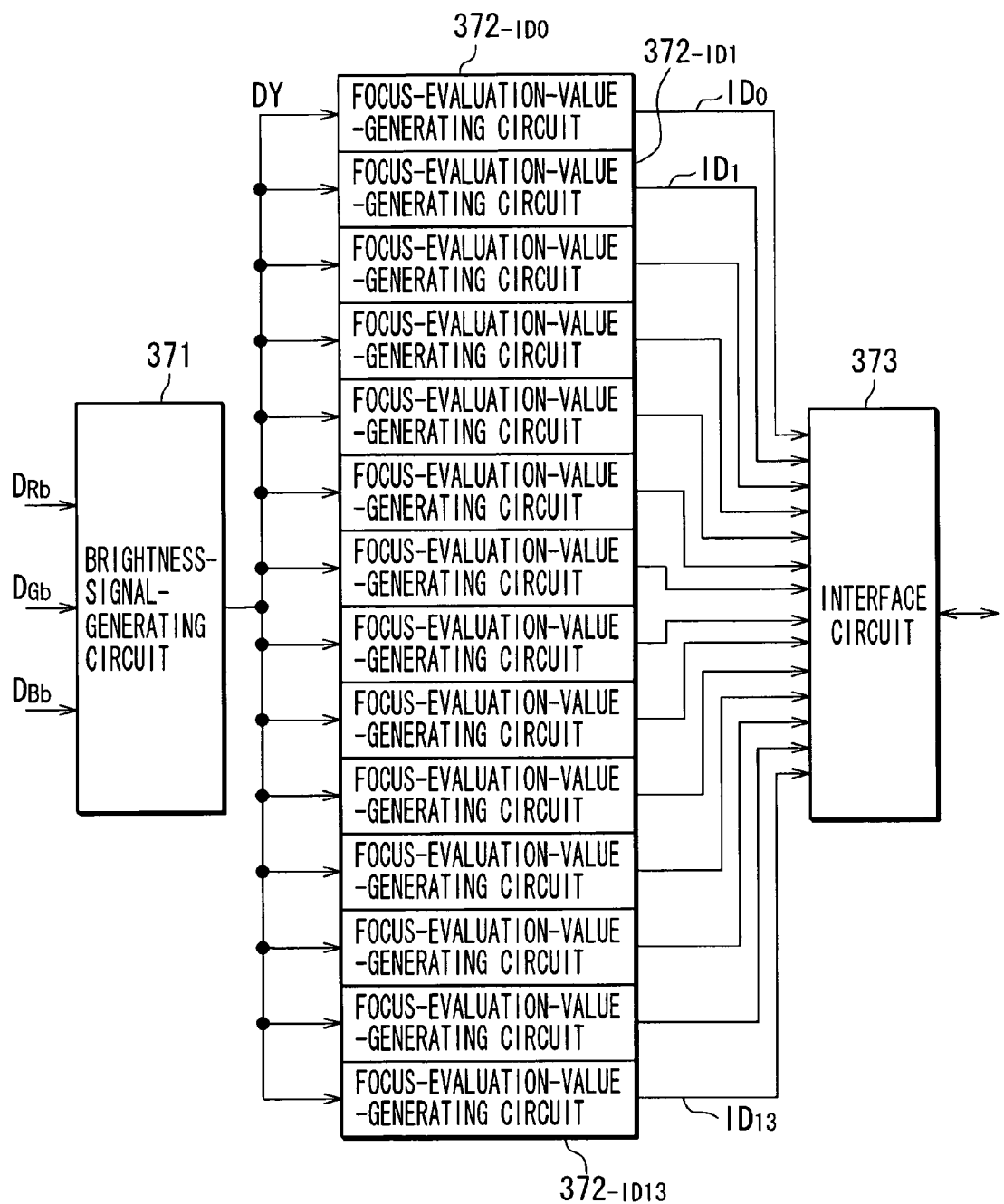
FIG. 3 is a block diagram for showing a configuration of a focus-evaluation-value-calculating unit.

FIG. 3 shows a configuration of the focus-evaluation-value-calculating unit 37. The focus-evaluation-value-calculating unit 37 has a brightness-signal-generating circuit 371 for generating a brightness signal DY based on the image signals DRb, DGb, and DBb, focus-evaluation-value-generating circuits 372-ID0 through 372-ID13 for generating fourteen kinds of focus evaluation values ID0 through ID13, which will be described later, and an interface circuit 373 for communicating with the camera-block-controlling unit 52 and supplying the generated focus evaluation values ID0 through ID13 to the camera-block-controlling unit 52 according to any request from the camera-block-controlling unit 52.

By using the image signals DRb, DGb, and DBb received from the preprocessing circuit 35, the brightness-signal-generating circuit 371 generates the brightness signal DY calculating as follows:

$$DY=0.30DRb+0.59DGb+0.11DBb.$$

This is because it is adequate to determine whether a contrast is high or low in order to determine whether the focus is achieved and adequate to detect an alteration in level of the brightness signal DY as an alteration in the contrast.

The focus-evaluation-value-generating circuit 372-ID0 generates the following focus evaluation values ID0. Similarly, each of the focus-evaluation-value-generating circuits 372-ID1 through 372-ID13 generates the following focus evaluation values ID1 through ID13.

Focus evaluation value ID0: a name of focus evaluation value, "IIR1_W1_HPeak";

Focus evaluation value ID1: a name of focus evaluation value, "IIR1_W2_HPeak";

Focus evaluation value ID2: a name of focus evaluation value, "IIR1_W2_HPeak";

Focus evaluation value ID3: a name of focus evaluation value, "IIR4_W3_HPeak";

Focus evaluation value ID4: a name of focus evaluation value, "IIR0_W1_VIntg";

Focus evaluation value ID5: a name of focus evaluation value, "IIR3_W1_VIntg";

Focus evaluation value ID6: a name of focus evaluation value, "IIR1_W1_HIntg";

Focus evaluation value ID7: a name of focus evaluation value, "Y_W1_HIntg";

Focus evaluation value ID8: a name of focus evaluation value, "Y_W1_Satul";

Focus evaluation value ID9: a name of focus evaluation value, "IIR1_W3_HPeak";

Focus evaluation value ID10: a name of focus evaluation value, "IIR1_W4_HPeak";

Focus evaluation value ID11: a name of focus evaluation value, "IIR1_W5_HPeak";

Focus evaluation value ID12: a name of focus evaluation value, "Y_W3_HIntg; and

Focus evaluation value ID13: a name of focus evaluation value, "Y_W3_HIntg.

Herein, to the above focus evaluation values ID0 trough ID13, respectively, are applied the names of focus evaluation values indicating attributes thereof, "use data_a size of evaluation window_a calculation method of focus evaluation value". The evaluation window is a particular region that is provided in an image frame.

These focus evaluation values ID0 through ID13 are basically obtained by adding frequency components of an image signal together in the evaluation window and indicate values corresponding to any blurs in an image.

There are "IIR" and "Y" in the "use data" of the names of focus evaluation values. The "IIR" uses data on high frequency component that is filtered out of the brightness signal DY by using a high-pass filter (HPF). The "Y" uses frequency component of the brightness signal DY as it is without using any HPF.

When using HPF, an infinite impulse response (IIR) typed HPF may be used. Based on species of HPF, IIR is classified into IIR0, IIR1, IIR3, and IIR4, which represent HPFs having different cut-off frequencies. Setting HPF so as to have different cut-off frequencies allows an alteration in the focus evaluation values to be enlarged, for example, at a near position of in-focus position if an HPF having a high cut-off frequency is used, in contrast with a case where an HPF having a low cut-off frequency is used. If it is hardly focused, an alteration in the focus evaluation values can be enlarged when an HPF having a low cut-off frequency is used, in contrast with a case where an HPF having a high cut-off frequency is used. Thus, HPF can be set so as to have different cut-off frequencies, in order to select a most suitable focus evaluation value according to any focus situation during auto-focus operations.

The size of evaluation window is a size of image region to be used for generating the focus evaluation value. In this embodiment, various sizes of the evaluation window illustrate the following five species of the sizes of the evaluation windows W1 through W5.

Size of evaluation window W1: 116 pixels by 60 pixels;
Size of evaluation window W2: 96 pixels by 60 pixels;
Size of evaluation window W3: 232 pixels by 120 pixels;
Size of evaluation window W4: 192 pixels by 120 pixels; and
Size of evaluation window W5: 576 pixels by 180 pixels.

Figure 4:
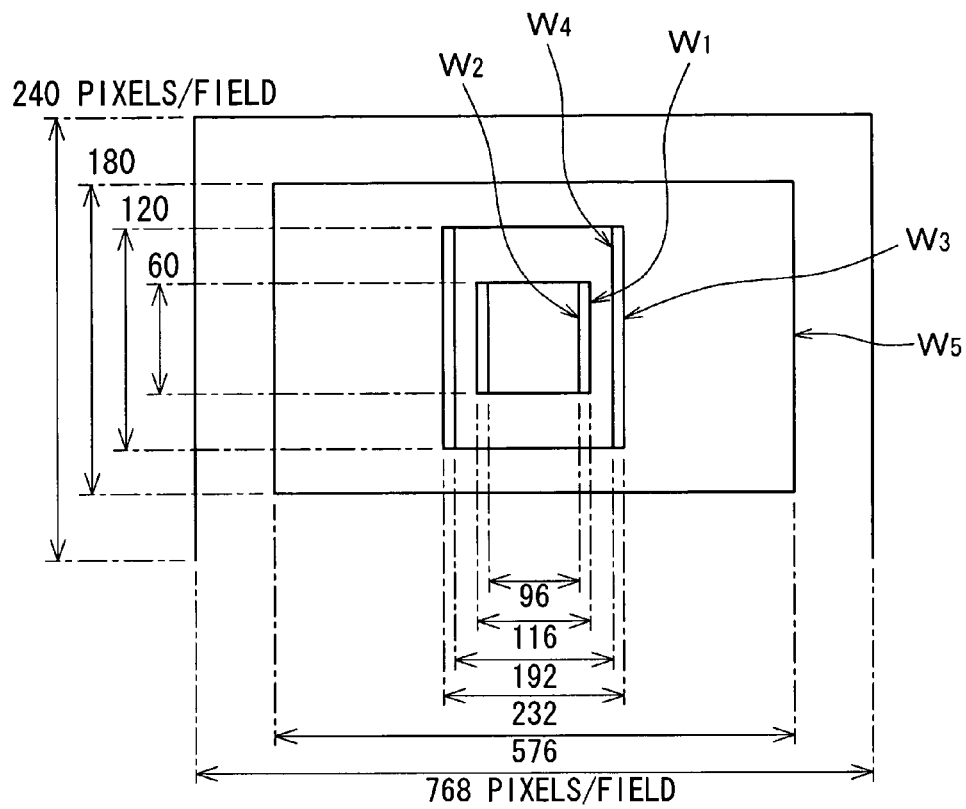
FIG. 4 is a diagram for showing sizes of evaluation windows.

A center of each of these evaluation windows aligns a center of imaging frame. It is to be noted that, in FIG. 4, the sizes of the evaluation windows W1 through W5 are illustrated in a case where a frame size of one field is 768 pixels by 240 pixels.

Thus, setting the evaluation windows so as to have a various kinds of sizes thereof allows to be produced any focus evaluation values each suitable to any sizes of the evaluation windows. This allows any suitable focus evaluation values to be selected among the focus evaluation values ID0 through ID13 to meet whatever size target subject has.

As the calculation method of focus evaluation value, HPeak scheme, HIntg scheme, VIntg scheme, and Satul scheme may be illustrated. The HPeak scheme is a calculation method of horizontal direction focus evaluation values relative to any peaks. The HIntg scheme is a calculation method of horizontal direction focus evaluation values relative to any horizontal and vertical integration. The VIntg scheme is a calculation method of vertical direction focus evaluation values relative to any integration. The Satul scheme is a calculation method of calculating a number of pixels saturated in brightness thereof.

The HPeak scheme is also a calculation method of focus evaluation values for obtaining any high frequency component from a horizontal direction image signal using HPF. In this embodiment, it is used for calculating the focus evaluation values ID0, ID1, ID2, ID3, ID9, ID10, and ID11.

Figure 5:
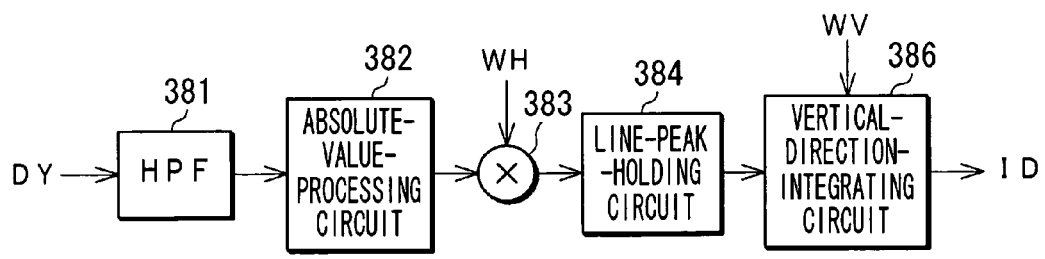
FIG. 5 is a block diagram for showing a configuration of a calculation filter for filtering a horizontal direction focus evaluation value.

FIG. 5 shows a configuration of a calculation filter for filtering a horizontal direction focus evaluation value to be used for the HPeak scheme, which may be used in the focus-evaluation-value-calculating unit 37. This calculation filter for filtering a horizontal direction focus evaluation value has an HPF 381 for filtering only high frequency components out of brightness signal DY from a brightness-signal-generating circuit, an absolute-processing circuit 382 for computing an absolute of these high frequency components, a multiplication circuit 383 for multiplying the absolute of these high frequency components by a horizontal direction window control signal WH, a line-peak-holding circuit 384 for holding a peak value per one line, and a vertical-direction-integrating circuit 386 for vertically integrating peak values of all the lines within the evaluation window.

The HPF 381 filters high frequency components out of the brightness signal DY and the absolute-processing circuit 382 computes an absolute of these high frequency components.

The multiplication circuit 383 multiplies the absolute by the horizontal direction window control signal WH to obtain an absolute value of the high frequency components within the evaluation window. In other words, if supplying to the multiplication circuit 383 a window control signal WH of which a multiplied value becomes zero out of the evaluation window, it is possible to supply to the line-peak-holding circuit 384 only a horizontal direction absolute of the high frequency components within the evaluation window. Further, if setting a window control signal WH so that the multiplied value can become smaller at a position near a window in the evaluation window, it is possible to eliminate any noise in the focus evaluation values based on an influence on an invasion of any extra-edges (any edges having high brightness) that exist near the window of the evaluation window into the evaluation window, which occurs responding to an advance of focusing, and an abrupt alteration in the focus evaluation values accompanied with any rolling and/or pitching of a subject.

The line-peak-holding circuit 384 may hold a peak value for every line. The vertical-direction-integrating circuit 386 vertically adds or integrates peak values, which have been held, of each line within the evaluation window based on a vertical direction window control signal WV to generate any focus evaluation values ID. It is to be noted that this scheme is so called as "HPeak" because a horizontal direction peak is once held.

Figure 6:
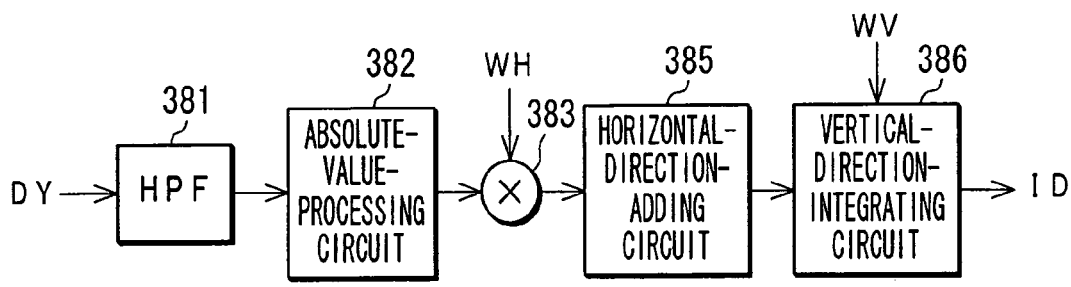
FIG. 6 is a block diagram for showing a configuration of a calculation filter of a horizontal and vertical direction integral scheme for filtering a horizontal direction focus evaluation value.

The HIntg scheme is a calculation method of focus evaluation values for obtaining horizontal direction focus evaluation values by using a vertical and horizontal integration. FIG. 6 shows a configuration of a calculation filter for filtering a horizontal direction focus evaluation value according to the vertical and horizontal integration, which may be used in the focus-evaluation-value-calculating unit 37. This calculation filter has a configuration similar to the above calculation filter of HPeak scheme as shown in FIG. 5 except for using a horizontal-direction-adding circuit 385 in stead of the line-peak-holding circuit. In this calculation filter shown in FIG. 6, the horizontal-direction-adding circuit 385 horizontally adds all the absolute values of the high frequency components within the evaluation window and the vertical-direction-integrating circuit 386 vertically integrates the added result of all the lines in the evaluation window.

Such the calculation filter for filtering a horizontal direction focus evaluation value according to the vertical and horizontal integration is used for calculating the focus evaluation values ID6, ID7, ID12, and ID13, in this embodiment.

As comparing the HIntg scheme with the HPeak scheme, they are different from each other in that in the HPeak scheme, a peak value is calculated for every line and the calculated peak values are vertically added while in the HIntg, all the absolute values of the high frequency components in each line within the evaluation window are horizontally added and the added ones are vertically integrated.

The HIntg scheme is classified into "IIR1" that a high frequency component is used in its use data and "Y" that uses therein the brightness signal DY itself as it is. It is to be noted that a brightness-adding-value-calculating filter circuit, which is a filter circuit that removes HPF 381 from the calculation filter shown in FIG. 6, can get a brightness-adding value.

The VIntg scheme is a calculation method of focus evaluation values for obtaining vertical direction focus evaluation values by using a vertical integration. In this embodiment, it is used for calculating the focus evaluation values ID4, and ID5. Both of the HPeak and HIntg schemes perform a horizontal addition to produce the focus evaluation values while the VIntg scheme adds high frequency components vertically to produce the focus evaluation values. If only the vertical high frequency components exist but no horizontal high frequency component exist, for example, an image in which an upper half of scene is white and a lower half of the scene is black, an image of the horizon or the like, the calculation method of horizontal direction focus evaluation values according to the HPeak scheme does not effectively function. The focus evaluation values of the VIntg scheme are used for the autofocus to function effectively in such the scenes.

Figure 7:
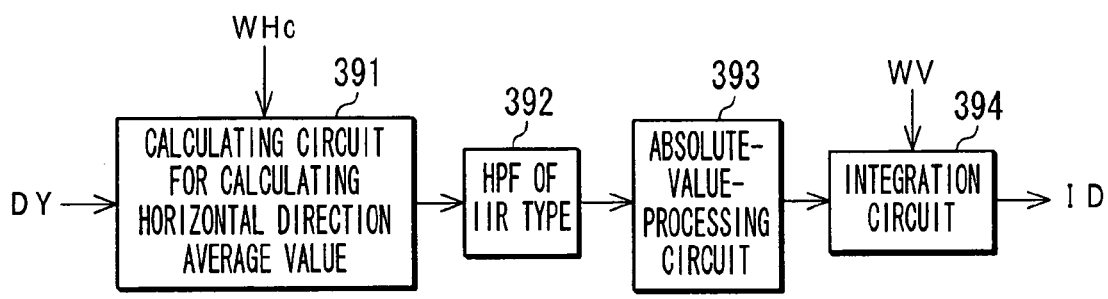
FIG. 7 is a block diagram for showing a configuration of a calculation filter for filtering a vertical direction focus evaluation value.

FIG. 7 shows a configuration of a calculation filter for filtering a vertical direction focus evaluation value, which may be used in the focus-evaluation-value-calculating unit 37. The calculation filter for filtering a vertical direction focus evaluation value has a calculating circuit 391 for calculating a horizontal direction average value, an HPF 392 of IIR type, an absolute-value-processing circuit 393, and an integration circuit 394.

The calculating circuit 391 selects from the brightness signal DY of each line a brightness signal of any pixels (for example, 63 pixels) positioned at a center portion of the evaluation window in a horizontal direction thereof based on a window control signal WHc and calculates an average value thereof to transmit it as one output per one horizontal period. It is because any noise existed at a periphery of the evaluation window is eliminated to select 64 pixels of the center portion thereof. In this embodiment, since data of 64 pixels is stored in sequence and one average value is finally output, a simple configuration without any necessary for storage device such as a line memory or a frame memory can be achieved. Next, HPF 392 of IIR type filters a high frequency component with it being synchronized with a line frequency. The absolute-value-processing circuit 393 then computes an absolute of the high frequency components. The integration circuit 394 vertically integrates all the lines within the evaluation window based on the vertical direction window control signal WV.

The Satul scheme is a calculation method for obtaining a number of saturated pixel in the brightness signal DY (particularly, a number of the pixel of which brightness level becomes over a predetermined level) in the evaluation window. In this embodiment, the Satul scheme is used for calculating the focus evaluation value ID8. In the calculation of the focus evaluation value ID8, the focus evaluation value ID8 is determined by calculating how many pixels exceeding a threshold value α stay in the evaluation window for each field with the brightness signal DY being compared to the threshold value α.

Referring back to FIG. 2, a reference-signal-producing unit 40 produces a vertical synchronizing signal VD, a horizontal synchronizing signal HD, and a reference clock signal CLK, based on which each unit in the video camera 10 operates. The reference-signal-producing unit 40 supplies these signals to an image-pickup-device-driving unit 42. The image-pickup-device-driving unit 42 generates a driving signal RIR based on the vertical synchronizing signal VD, the horizontal synchronizing signal HD, and the reference clock signal CLK thus supplied to supply it to the image pickup device 32R in order to drive it. Similarly, the image-pickup-device-driving unit 42 also generates driving signals RIG, RIB, respectively, to supply them to the image pickup devices 32G, 32B in order to drive them. It is to be noted that the preamplifiers 33R, 33G, and 33B, the A/D converters 34R, 34G, and 34B, the preprocessing unit 35, the signal-processing unit 36, the focus-evaluation-value-calculating unit 37 and the like performs various kinds of processing using the vertical synchronizing signal VD, the horizontal synchronizing signal HD, and the reference clock signal CLK that are synchronized with an image signal received from their respective previous units. These signals may be received from the reference-signal-producing unit 40 or from their respective previous units together with the image signal.

Responding a request from the camera-block-controlling unit 52, a distance measurement sensor 45 performs any measurement to supply to the camera-block-controlling unit 52 a measured distance result Mag indicating a distance to a subject. When failing to perform any measurement, the distance measurement sensor 45 transmits data (hereinafter referred to as "inability data NG") indicating inability to perform any measurement as the measured distance result Mag. The distance measurement sensor 45 illustrates a distance measurement sensor of active scheme that measures a distance to a subject by utilizing a reflection of infrared ray, electric wave, or the like when irradiating it. The distance measurement sensor 45 also illustrates a distance measurement sensor of a passive scheme that measures a distance to a subject by utilizing a shift, sharpness or the like of brightness signal obtained by detecting brightness information on the subject using a sensor.

The camera-block-controlling unit 52 is connected to the user interface 56. The camera-block-controlling unit 52 generates any control signals based on a manipulation signal PSC received from the user interface 56 and supplies the control signals to respective units to control them so that the video camera 10 can operate based on the manipulation signal PSC or the like.

The lens-block-controlling unit 51 and the camera-block-controlling unit 52 can be communicated to each other using a previously set format and/or a previously set protocol. The lens-block-controlling unit 51 and the camera-block-controlling unit 52 perform any control on autofocus operations.

The lens-block-controlling unit 51 also supplies to the camera-block-controlling unit 52 various kinds of information QF (for example, information on a position of a focal point of the lens, an iris value and the like) responding a request from the camera-block-controlling unit 52.

The lens-block-controlling unit 51 further generates lens-driving signals RDf, RDw based on the focus control signal CTf, the wobbling control signal CTw and the like that are received from the camera-block-controlling unit 52 and controls the lens-driving units 21b, 22b to drive the focus lens 21 and wobbling lens 22.

The camera-block-controlling unit 52 generates the focus control signal CTf for performing a drive control of the focus lens 21 and the wobbling control signal CTw for performing a drive control of the wobbling lens 22, based on the focus evaluation values ID calculated in the focus-evaluation-value-calculating unit 37, the measured distance result Mag obtained by the distance measurement sensor 45, and various kinds of information read out of the lens-block-controlling unit 51. The camera-block-controlling unit 52 supplies them to the lens-block-controlling unit 51.

The lens-block-controlling unit 51 and the camera-block-controlling unit 52 can be built-in together. In the following description, a controller 50 will indicate a combination of the lens-block-controlling unit 51 and the camera-block-controlling unit 52. The controller 50 may be constituted of microcomputer, a memory and the like and execute autofocus operations by running various programs read out of the memory.

Figure 8:
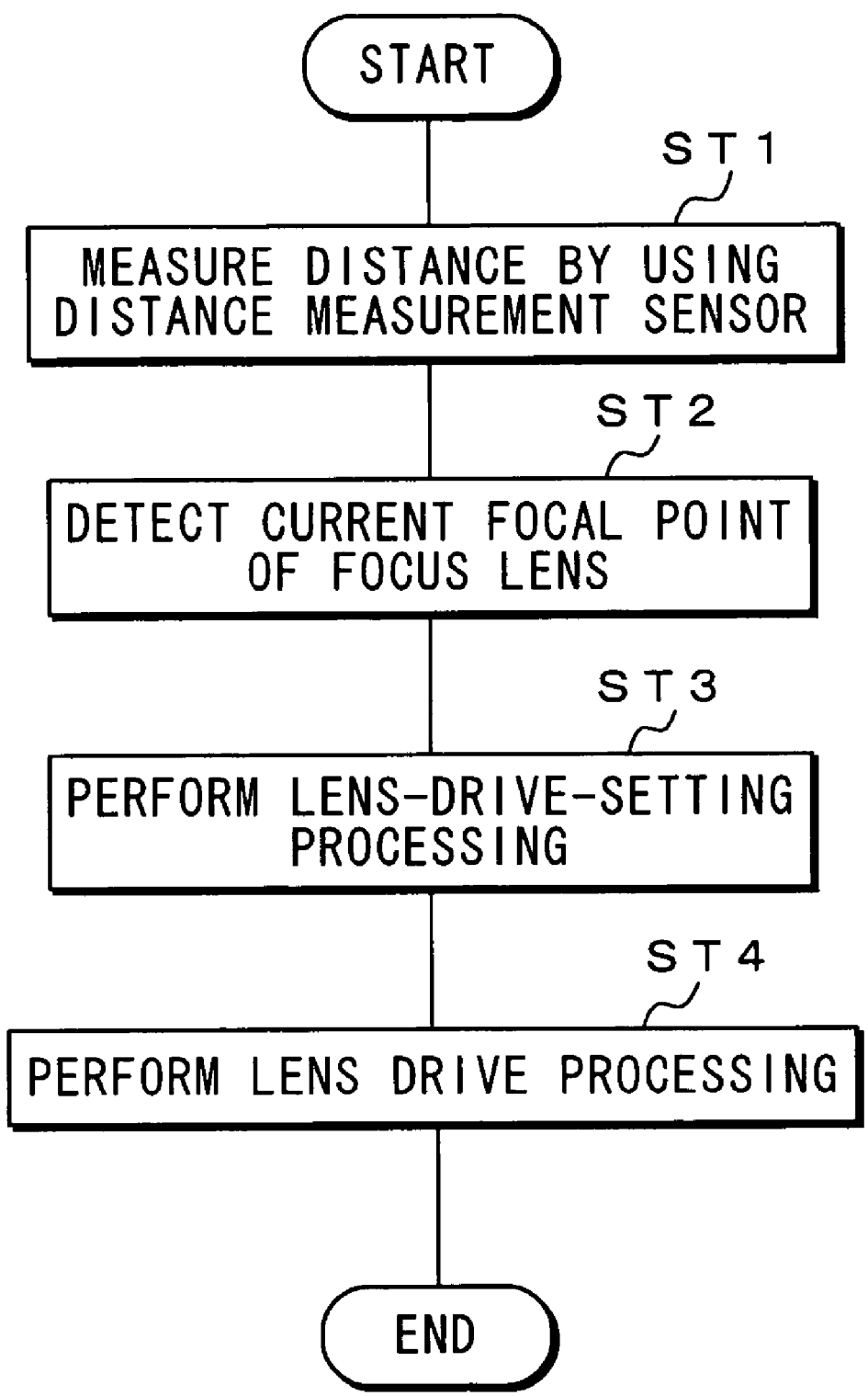
FIG. 8 is a flowchart for showing autofocus operations of the video camera.

The following will describe autofocus operations of the video camera 10. FIG. 8 shows a flowchart of the autofocus operations.

At a step ST1, the controller 50 controls the distance measurement sensor 45 to measure the distance to a subject and to transmit the measured distance result Mag.

At a step ST2, the controller 50 detects a current position of a focal point FPs of the focus lens 21 based on a detection signal RSf received from the lens-position-detecting unit 21a.

At a step ST3, the controller 50 performs any lens-drive-setting processing. In such the lens-drive-setting processing, a driving direction and a driving speed of the focus lens 21 is set based on the current position of a focal point FPs and the measured distance result Mag.

At a step ST4, the controller 50 then performs lens drive processing.

Figure 9:
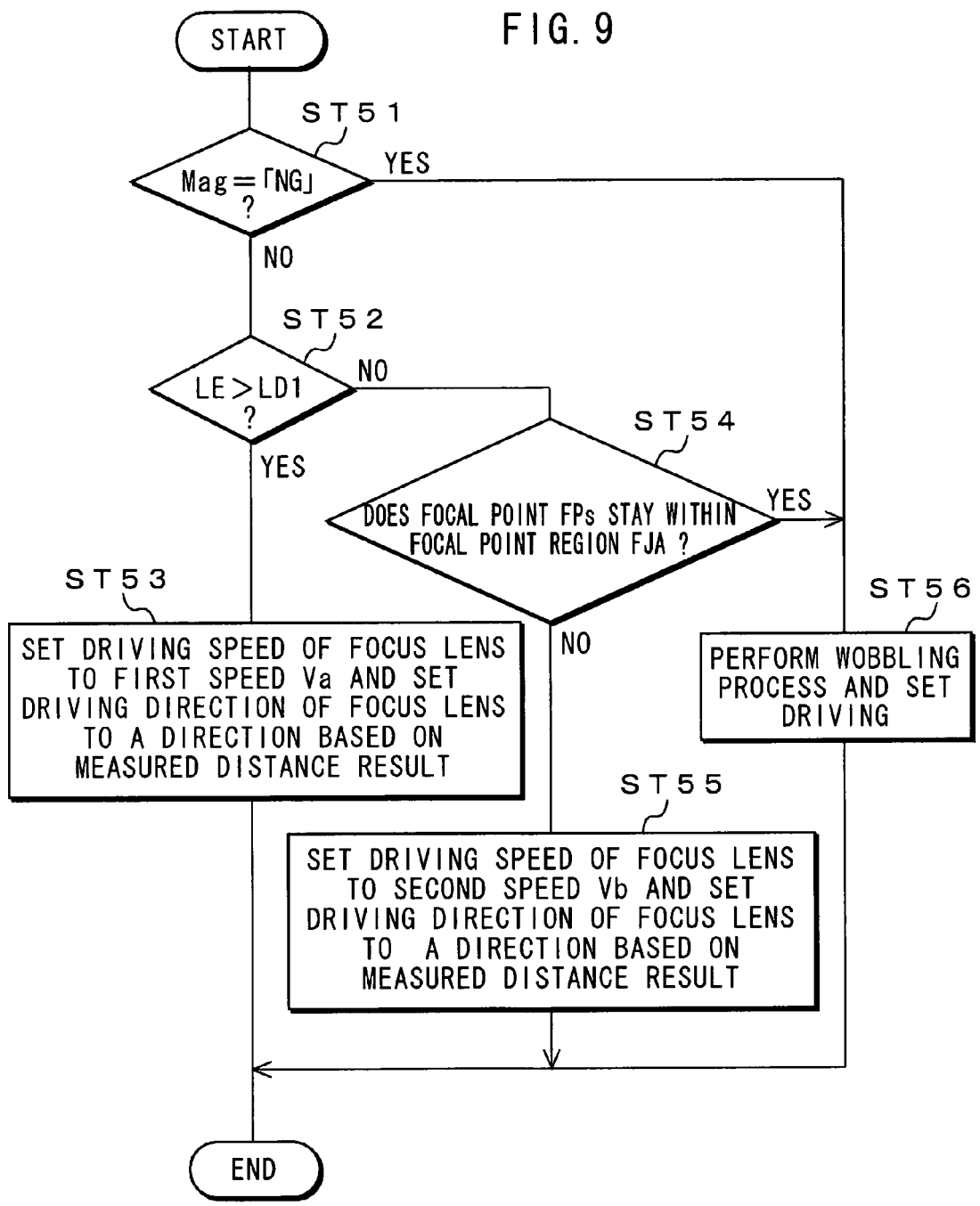
FIG. 9 is a flowchart for showing lens-drive-setting processing.

FIG. 9 shows a flowchart of the lens-drive-setting processing.

At a step ST51, the controller 50 determines whether the measured distance result Mag is inability data NG. If no inability data NG, the processing goes to a step ST52 while if inability data NG, the processing goes to a step ST 56.

At the step ST52, the controller 50 determines whether the current position of the focal point FPs stays away from the in-focus region FJA based on the measured distance result Mag with it staying further away from a first determined distance LD1. If a distance LE from the current position of the focal point FPs to the in-focus region FJA based on the measured distance result Mag is longer than the first determined distance LD1, the processing goes to a step ST53 while if not, the processing goes to a step ST54.

The in-focus region FJA is set relative to the measured distance result Mag so that a in-focus position FPj on a subject, which corresponds to the measured distance result Mag, can be included therein. For example, an erroneous region of distance measurement based on the measured distance result Mag is set to the in-focus region FJA. Alternatively, a region that is wider than the erroneous region of distance measurement based on the measured distance result mag may be set to the in-focus region FJA. An amount of the first determined distance LD1 can be set taking into consideration a control facility of the focus lens 21. Namely, if the focus lens 21 is tried to be driven at a first driving speed Va, which will be described later, when the first determined distance LD1 is too short, the focus lens would have already reached the in-focus position FPj before it reaches to the first driving speed Va. If the focus lens 21 is driven at a very high speed, it may take much time to stop the focus lens 21, so that if the focus lens 21 is tried to stop when the focus lens 21 reaches near the in-focus position FPj, the focus lens 21 may pass through the in-focus position FPj, thereby resulting in poor focus operation. Therefore, the first determined distance LD1 can be set based on a maximum speed and control facility when the focus lens 21 is driven. Since such the maximum speed and control facility are different based on focus length and an iris value, the first determined distance LD1 can be adjusted based on the focus length and the iris value.

If a focus length is short or an opening level of aperture of the iris is small, a depth-of-field may be deep. If a focus length is long or an opening level of aperture of the iris is larger, a depth-of-field may be shallow. If a depth-of-field is deep, an alteration in the focus evaluation values when the focus lens 21 is driven is small so that the focus evaluation value alters slowly over a long distance to show a gradual peak in its curve. Therefore, if so, the first determined distance LD1 may be set longer so as to avoid driving the focus lens 21 at the first driving speed Va during a part of the curve where the focus evaluation value alters. In this case, even if the first determined distance LD1 is set longer and a period of time when the focus lens 21 is driven at the first driving speed Va is made shorter, it is possible to rapidly get an image having less or no blur because the depth-of-field is deep.

If a depth-of-field is shallow, an alteration in the focus evaluation values when the focus lens 21 is driven is larger so that the focus evaluation value alters suddenly at a short distance to show a sharp peak in its curve. Therefore, even if the first determined distance LD1 is set to be short, it is possible to prevent the focus lens 21 from being driven at the first driving speed Va during a part of the curve where the focus evaluation value alters. Further, the first determined distance LD1 is set to be short so that a period of time when the focus lens 21 is driven at the first driving speed Va is made longer, thereby allowing to be rapidly gotten an image having less or no blur.

At the step ST53, the controller 50 sets a driving speed of the focus lens 21 to the first driving speed Va to let the focal point FPs of the focus lens 21 rapidly arrive the in-focus position FPj because the current position of the focal point FPs of the focus lens 21 stays away from the in-focus region FJA with the position of the focal point staying further away from the first determined distance LD1. The controller 50 also sets a driving direction of the focus lens 21 to a direction based on the measured distance result Mag. In other wards, the driving direction is set so that the focal point FPs of the focus lens 21 can be driven toward a direction of a position of a focal point FPm indicated by the measured distance result Mag. Since it is possible to correctly determine a driving direction of the focus lens 21 based on the measured distance result Mag by the distance measurement sensor 45, any wobbling is not necessary for determining its driving direction thereof.

The first driving speed Va of the focus lens 21 is used for allowing the focal point of the focus lens 21 to be rapidly approached to the in-focus position. It is not necessary to limit its driving speed to prevent the focal point thereof from passing through the peak in the curve of the focus evaluation values because every focus evaluation value is revised only one time per one field. Thus, the first driving speed Va may be maximum one of allowable driving speeds when the focus lens 21 is driven.

The processing then goes to the step ST54 where the controller 50 determines whether a current position of the focal point FPs of the focus lens 21 stays within the in-focus region FJA. If no position of the focal point FPs stays within the in-focus region FJA, the processing goes to a step ST55 while if the position of the focal point FPs stays within the in-focus region FJA, the processing goes to a step ST56.

At the step ST55, the controller 50 sets a driving speed of the focus lens 21 to a second driving speed Vb that is slower than the first driving speed Va. The controller 50 also sets a driving direction thereof to a direction based on the measured distance result Mag. In other words, the driving direction thereof is set so that the focal point FPs of the focus lens 21 can be driven toward a direction of a position of a focal point FPm indicated by the measured distance result Mag. This second driving speed Vb is set to allow a speed change from the second driving speed Vb to a third driving speed Vc that is slower than the second driving speed vb to be smoothly achieved in order to prevent a curve of the focus evaluation values indicating an alteration in the focus evaluation values when the focus lens 21 is driven from being dwarfed.

For example, it is estimated that a depth-of-field is Fs, the second driving speed Vb is set to 12 Fs/field. It is to be noted that the third driving speed Vc is set to a speed that is capable of detecting a peak of the curve of the focus evaluation values accurately, for example, 2 Fs/field. If the maximum one of allowable speeds when the focus lens 21 is driven is not more than 12 Fs/field, the first driving speed Va is equal to the second driving speed Vb.

When the processing goes to the step ST56 from the step ST51 or ST54, the controller 50 performs wobbling similar to the past cases, and sets a driving direction of the focus lens 21 based on an alteration in the focus evaluation values when the wobbling lens 22 is driven. In this case, the controller 50 sets a driving speed of the focus lens 21 to the second driving speed Vb thereof. If a distance between the current position of the focal point FPs and a position of the focal point FPm is short, the controller 50 can set a driving speed of the focus lens 21 to the third driving speed Vc thereof because the current position of the focal point FPs stays near the in-focus position FPj.

Thereafter, at the step ST4 shown in FIG. 8, the controller 50 performs the lens drive processing and finishes the autofocus operations when the lens drive processing is completed. In the lens drive processing, a switch of driving speeds of the focus lens 21 and hill-climbing control processing similar to the past cases are performed, so that the focus lens 21 is driven to meet a position of the focal point FPs thereof to the in-focus position FPj.

If a distance from a position of the focal point FPS to the in-focus region FJA is shorter than a second determined distance LD2 that is shorter than the first determined distance LD1, the driving speeds of the focus lens 21 is switched from the first driving speed Va to the second driving speed Vb. The second determined distance LD2 is set so that the driving speed of the focus lens 21 can be decreased to the second driving speed Vb within the in-focus region FJA when the driving speed of the focus lens 21 is switched from the first driving speed Va to the second driving speed vb, which will be described later, at a position, for example, away from the in-focus region FJA by the second determined distance LD2. Such the setting may prevent a focal point of the focus lens 21 from passing through a peak of the curve of the focus evaluation values in the in-focus region FJA because of less numbers of the focus evaluation values.

In the hill-climbing control processing, any increase and decrease in the focus evaluation values calculated by the focus-evaluation-value-calculating unit 37 are detected and the focus lens 21 is driven so that this detected focus evaluation value can be maximum value, thereby meeting a position of the focal point FPs to the in-focus position FPj. In the hill-climbing control processing using the focus evaluation values in this embodiment, the focus lens 21 is driven so that the above focus evaluation value ID0, ID2 or the like can be maximum value. If pixels having larger brightness increase, an evaluation window size W1 is switched to an evaluation window size W5 and the focus evaluation value is calculated by using the focus evaluation value ID8, in order to prevent the focus lens 21 from being driven to a direction where blur occurs. Further, by using the focus evaluation value ID0 and other focus evaluation values ID1 through ID7 and ID9 through ID13, a change of driving speeds of the focus lens 21 can be determined, any vibration of the video camera can be determined, a reverse driving of the focus lens 21 can be determined, and a reach of focus lens 21 to its Near point or Far point can be determined. Based on these determination results, driving operations of the focus lens 21 is controlled to achieve an excellent accurate focusing. Thus, such the hill-climbing control processing is performed to meet the position of the focal point of the focus lens 21 to the in-focus position FPj. The autofocus operations finish.

Figure 10:
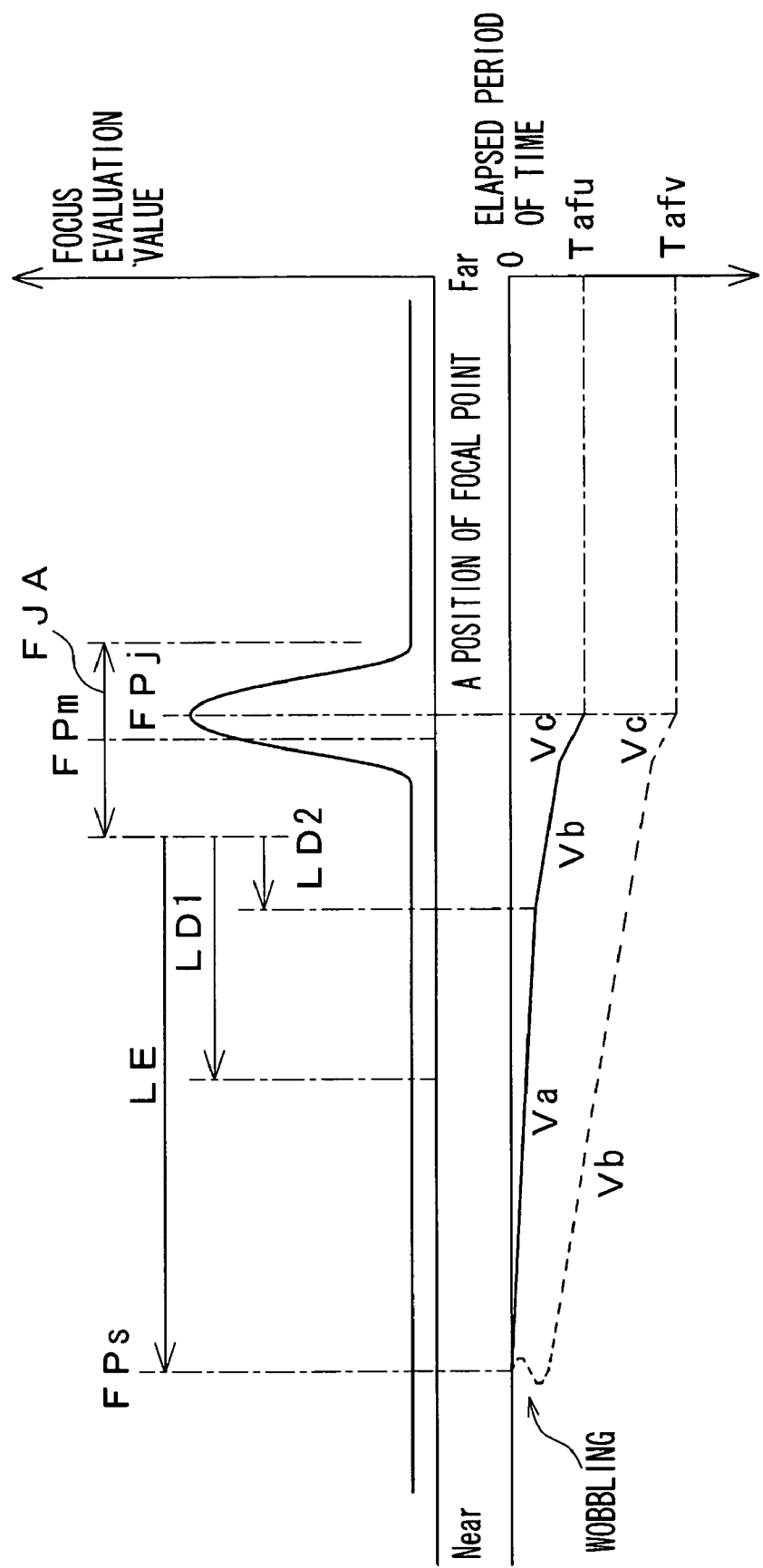
FIG. 10 is a diagram for explaining autofocus operations using a measured distance result.

FIG. 10 shows the autofocus operations using the measured distance result. When a current position of the focal point FPs of the focus lens 21 stays away from the in-focus region FJA based on the measured distance result Mag with the position of the focal point staying further away from the first determined distance LD1, namely, the distance LE from the current position of the focal point FPs to the in-focus region FJA based on the measured distance result mag is longer than the first determined distance LD1, the focus lens 21 is driven at the first driving speed Va without any wobbling. The focus lens 21 is then driven at the second driving speed Vb and the third driving speed Vc. When a period of time Tafu is elapsed, the position of focal point FPs meets the in-focus position FPj. This allows a period of focusing time to be much shortened as comparing it with the past autofocus operations, shown in FIG. 10 by broken lines, such that wobbling is performed to determine a direction where the focus lens is driven, the focus lens 21 is then driven at the second driving speed Vb, and when a period of time Tafv is elapsed, the position of focal point FPs meets the in-focus position FPj.

When a current position of the focal point FPs stays nearer the in-focus region FJA based on the measured distance result Mag than the first determined distance LD1 with the position of the focal point staying out of the in-focus region FJA, the focus lens 21 is driven at the second driving speed Vb without any wobbling. This allows a period of focusing time to be shortened as comparing it with the past autofocus operation such that the wobbling is performed at a start point of the autofocus operation. Particularly, a video camera used for broadcasting or professional use has lens with a large aperture to spend much time for wobbling (for example, 0.25 to 0.5 second). Thus, only avoiding the wobbling may cause a period of focusing time to be effectively shortened.

When a current position of the focal point FPs of the focus lens 21 stays within the in-focus region FJA, a driving direction of the focus lens 21 fails to be determined on the basis of the measured distance result Mag and the current position of the focal point FPs. In other words, the measured distance result Mag may include any errors and thus, if a current position of the focal point FPs of the focus lens 21 stays within region between a position of the focal point FPm indicated by the measured distance result Mag and the in-focus position FPj, the focus lens 21 may be driven toward a reverse direction against a direction where the in-focus position FPj stays when the focus lens 21 is driven based on such the measured distance result Mag. Therefore, when a current position of the focal point FPs of the focus lens 21 stays within the in-focus region FJA, in this embodiment, wobbling is performed to determine a direction where the focus lens is driven and any hill-climbing control processing is carried out, similar to the past autofocus operations. Thus, when a current position of the focal point FPs of the focus lens 21 stays within the in-focus region FJA, the autofocus operations in this embodiment elapse at the same period of time as that of the past autofocus operations.

If the distance measurement sensor 45 fails to measure a distance correctly and the measured distance result Mag indicates inability data NG, any driving operations of the lens is failed based on the measured distance result Mag. Thus, the autofocus operations in this embodiment is carried out like the past autofocus operations. In this case, the autofocus operations in this embodiment also elapse at the same period of time as that of the past autofocus operations.

Thus, when a current position of the focal point FPs of the focus lens 21 stays away from the in-focus region FJA, in the embodiments of the invention, it is possible to shorten the period of focusing time because the focus lens starts its driving without any wobbling. When a current position of the focal point FPs of the focus lens 21 stays away from the in-focus region FJA with it staying further away from the first determined distance LD1, it is possible to shorten the period of focusing time further because the focus lens is rapidly driven. When a current position of the focal point FPs of the focus lens 21 stays within the in-focus region FJA, the autofocus operations in this embodiment is carried out like the past autofocus operations but the embodiments of the invention may expect same focusing accuracy as that of the past autofocus operation even if it takes any shorten period of focusing time.

Although an imaging device has been described as a video camera in the above embodiments, this invention is not limited thereto. This invention is applicable to any other imaging device such s digital still camera.

Although the focus lens 21 and the wobbling lens 22 have been described as an imaging lens in the above embodiments, this invention is not limited thereto. This invention is applicable to a lens functioning as both of the focus lens and the wobbling lens.

It should be understood by those skill in the art that various modifications, combinations, sub-combinations and alterations may occur depending on design requirements and other factors insofar as they are within the scope of the appended claims or the equivalents thereof.

What is claimed is:

1. An autofocus device comprising:
a lens-driving unit that drives a lens;
a focal-point-position-detecting unit that detects a position of a focal point of the lens;
a distance-measuring sensor that measures a distance to a subject; and
a control unit that performs a focusing operation to control the lens-driving unit to drive the lens, thereby meeting the position of the focal point of the lens detected by the focal-point-position-detecting unit to an in-focus position thereof,
wherein the control unit sets a driving direction of the lens and a driving speed of the lens based on (a) the position of the focal point of the lens detected by the focal-point-position-detecting unit and (b) a distance measurement result measured by the distance-measuring sensor and starts the focusing operation,
wherein the control unit sets the driving direction of the lens and the driving speed of the lens to a direction of in-focus region based on the measured distance result and a first driving speed, respectively, when the position of the focal point detected by the focal-point-position-detecting unit stays away from the in-focus region based on the measured distance result with the position of the focal point staying further away from a first determined distance, and thereafter starts the focusing operation.

2. The autofocus device according to claim 1, wherein the control unit switches the driving speed of the lens from the first driving speed to a second driving speed that is slower than the first driving speed when the position of the focal point detected by the focal-point-position-detecting unit stays from the in-focus region based on the measured distance result with the position of the focal point staying nearer than a second determined distance.

3. The autofocus device according to claim 1, wherein the control unit sets the driving direction of the lens and the driving speed of the lens to a direction of in-focus region based on the measured distance result and a second driving speed that is slower than the first driving speed when the position of the focal point detected by the focal-point-position-detecting unit stays nearer the in-focus region based on the measured distance result than the first determined distance with the position of the focal point staying out of the in-focus region, and thereafter the control unit starts the focusing operation.

4. The autofocus device according to claim 1, further comprising a focus-evaluation-value-calculating unit that calculates a focus evaluation value using frequency component of an image signal in a particular region provided in an imaging frame,
wherein the control unit controls the lens-driving unit to drive the lens to meet a position of its focal point to an in-focus position having a maximum focus evaluation value, as the focusing operation, when the position of the focal point detected by the focal-point-position-detecting unit stays within the in-focus region based on the measured distance result.

5. The autofocus device according to claim 1, further comprising a focus-evaluation-value-calculating unit that calculates a focus evaluation value using frequency component of an image signal in a particular region provided in an imaging frame,
wherein the control unit controls the lens-driving unit (a) to wobble the lens when the position of the focal point detected by the focal-point-position-detecting unit stays within the in-focus region based on the measured distance result, and (b) to set a driving direction of the lens based on an alteration in the focus evaluation value at the wobbling thereof, and thereafter the control unit starts the focusing operation.

6. The autofocus device according to claim 5, wherein the control unit controls the lens-driving unit (a) to wobble the lens when the measured distance result indicates a position of the focal point staying nearer than a predetermined distance in spite of a position of the focal point detected by the focal-point-position-detecting unit, and (b) to set a driving direction of the lens based on an alteration in the focus evaluation value at the wobbling thereof, and thereafter the control unit starts the focusing operation with the driving speed of the lens being set as a predetermined driving speed.

7. The autofocus device according to claim 1, further comprising an iris that controls an amount of incident light,
wherein the first determined distance alters based on at least one of a focal length of the lens and an opening level of aperture of the iris.

8. An autofocus method comprising:
a focal-point-position-detecting step of detecting a position of a focal point of the lens;
a distance-measuring step of measuring a distance to a subject;
a lens-drive-setting step of setting a driving direction of the lens and a driving speed of the lens based on the position of the focal point of the lens detected at the focal-point-position-detecting step and a distance measurement result measured at the distance-measuring step; and
a lens-driving step of performing a focusing operation to start driving the lens based on the driving direction of lens and the driving speed of the lens, which are set by the lens-drive-setting step, thereby meeting the position of the focal point of the lens to an in-focus position thereof,
wherein the driving direction of the lens and the driving speed of the lens are set to a direction of in-focus region based on the measured distance result and a first driving speed, respectively, when the position of the detected focal point stays away from the in-focus region based on the measured distance result with the position of the focal point staying further away from a first determined distance, and thereafter starts the focusing operation.

9. A computer program product embodied on a computer readable medium that allows a computer to execute an auto-focus method, said method comprising:
 a focal-point-position-detecting step of detecting a position of a focal point of the lens;
 a distance-measuring step of measuring a distance to a subject;
 a lens-drive-setting step of setting a driving direction of the lens and a driving speed of the lens based on the position of the focal point of the lens detected at the focal-point-position-detecting step and a distance measurement result measured at the distance-measuring step; and
 a lens-driving step of performing a focusing operation to start driving the lens based on the driving direction of lens and the driving speed of the lens, which are set by the lens-drive-setting step, thereby meeting the position of the focal point of the lens to an in-focus position thereof,
 wherein the driving direction of the lens and the driving speed of the lens are set to a direction of in-focus region based on the measured distance result and a first driving speed, respectively, when the position of the detected focal point stays away from the in-focus region based on the measured distance result with the position of the focal point staying further away from a first determined distance, and thereafter starts the focusing operation.

* * * * *